Figure 1:
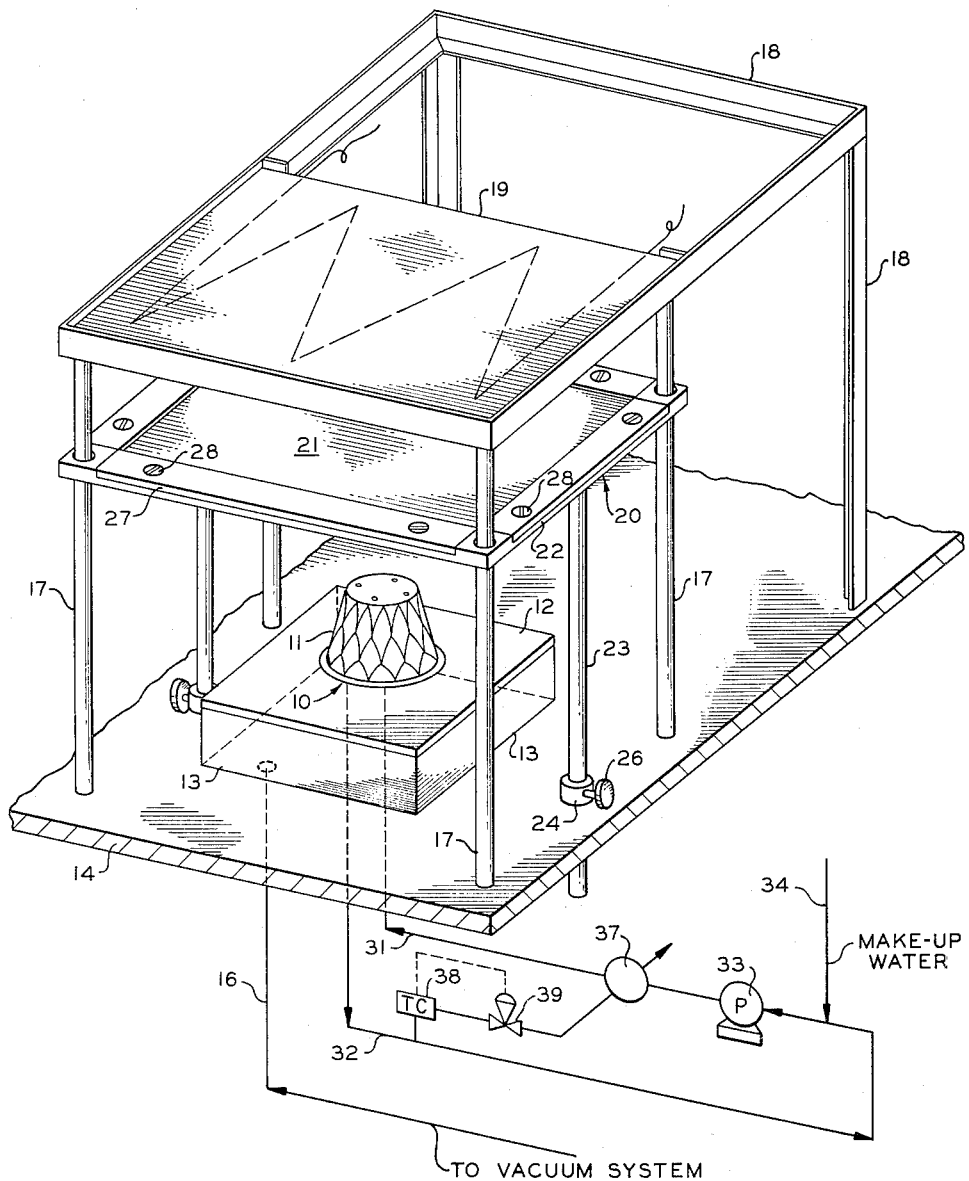

Feb. 6, 1962 R. DOYLE ET AL 3,019,488
METHOD FOR VACUUM MOLDING POLYMER SHEETS
Filed June 16, 1958 2 Sheets-Sheet 2

INVENTORS
ROBERT DOYLE
W. L. HOLT
W. E. COOPER
BY
ATTORNEYS

United States Patent Office 3,019,488
Patented Feb. 6, 1962

3,019,488
METHOD FOR VACUUM MOLDING POLYMER SHEETS
Robert Doyle, William L. Holt, and Wayne E. Cooper, Bartlesville, Okla., assignors to Phillips Petroleum Company, a corporation of Delaware
Filed June 16, 1958, Ser. No. 742,331
5 Claims. (Cl. 18—56)

This invention relates to the formation of plastic articles by a vacuum forming process.

Various methods are described in the literature for producing normally solid and semi-solid polymers. For example, hydrocarbons such as ethylene, propylene, isobutene, butadiene and styrene can be polymerized, either independently or in various admixtures with one another, to produce semi-solid or solid polymers. Recently, considerable attention has been directed to the production of solid polymers of ethylene and/or propylene. The polymerizations are frequently carried out at low pressures in the presence of solid catalysts, and high molecular weight polymers, such as polyethylenes, have been produced which have properties superior to those of low density, low crystallinity polymers prepared by previously known methods. These polymers differ from the latter polymers, which can be produced by high pressure processes, particularly as regards their high crystallinity, which may be in excess of 90 percent at 25° C., and they are especially useful where high stiffness and high tensile strength are desired. These highly crystalline polymers are suitable for a wide variety of applications, a very important one being their use in the manufacture of molded articles. However, when using conventional methods of vacuum forming in fabricating molded articles of the highly crystalline polymers, it has been found that the products are often non-uniform and are subject to considerable warpage after cooling to room temperature.

It is an object of this invention, therefore, to provide an improved method for vacuum forming plastic sheets formed of high density, highly crystalline polymers.

Another object of the invention is to provide a method for forming from high density, highly crystalline polymers uniform, warpage-free molded articles.

Other and further objects and advantages of the invention will become apparent to those skilled in the art upon consideration of the accompanying disclosure.

The instant invention is concerned with a process for vacuum forming articles from polymer sheets so as to provide products which are uniform and warpage-free. Broadly speaking, in a process in which a sheet of a high density, highly crystalline polymer is formed into a molded article by heating the sheet and thereafter pulling the sheet around the mold by evacuating the air from between the mold and the sheet, the invention resides in the improvement which comprises controlling the temperature of the mold so that its surface is a a predetermined temperature when the sheet initially contacts the mold surface. In general, the temperature of initial contacting is in the range of 150 to 230° F., the particular temperature used being dependent upon certain variables, including the configuration of the mold, the particular polymer employed, and the thickness of the polymer sheet.

In one embodiment, the apparatus for practicing the method of this invention for vacuum molding thermoplastic sheets comprises a mold, means for heating a plastic sheet, means for drawing a heated plastic sheet around the mold, means for evacuating air from between the mold and the heated plastic sheet, and means for controlling the temperature of the surface of the mold. In another embodiment, the apparatus for practicing the method of this invention for vacuum forming a sheet of plastic material into an article of a desired shape comprises a hollow mold in the form of a shell open at one end closed at the opposite end and having walls with an exterior surface in the shape of the article to be molded, passageways formed in the walls of the shell and extending through the exterior surface of the shell, means associated with the passageways for evacuating air from between the exterior surface of the shell and the plastic sheet, a removable, cooperating insert member adapted to be positioned within the shell and having an outer surface substantially of the same shape as and spaced apart from the inner surface of the shell, means for circulating a heat exchange medium between the interior surface of the shell and the outer surface of the insert member, means for controlling the temperature of said circulating heat exchange medium, means for holding a sheet of plastic material above the mold, the holding means being adapted to move the sheet into contact with the mold, and means for heating the sheet of plastic material prior to its being placed into contact with the mold.

Figure 2:
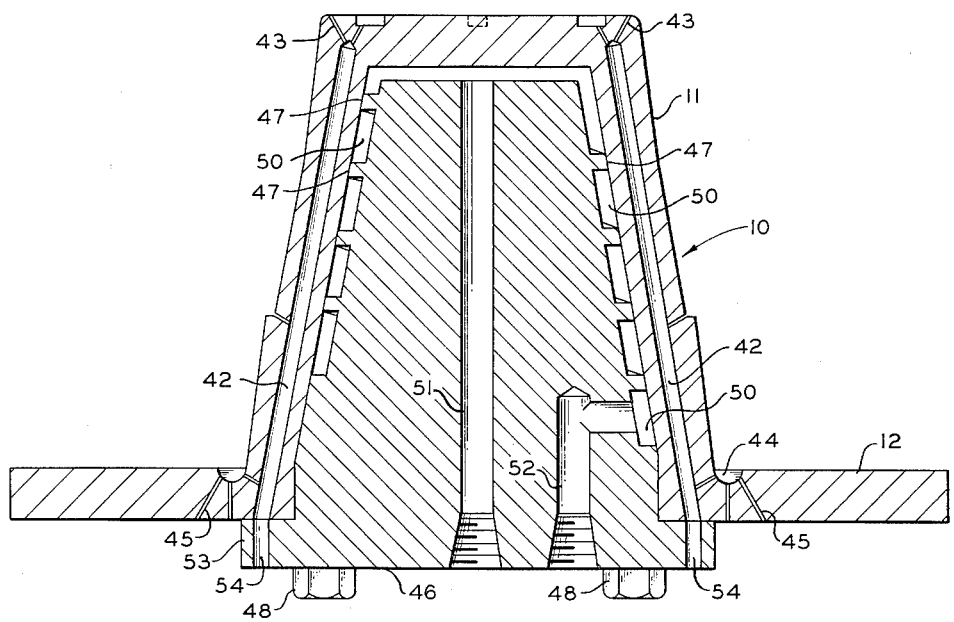
Figure 3:
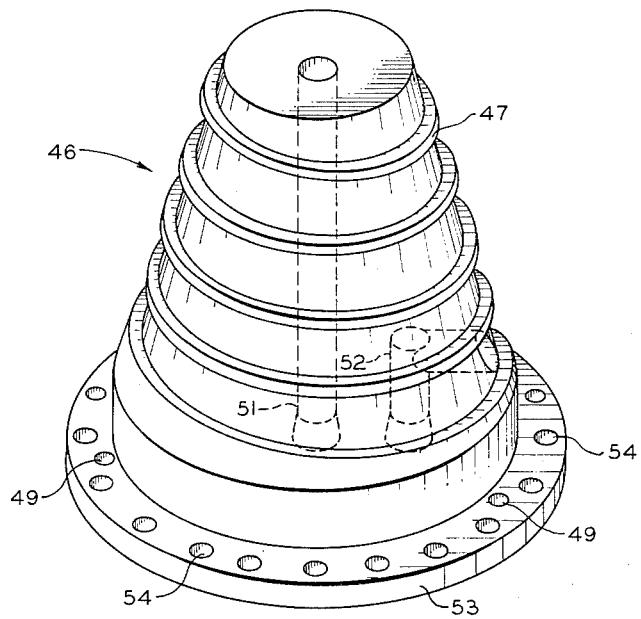

For a more complete understanding of the invention, reference is made to the drawings, in which FIGURE 1 is an isometric view showing an arrangement of apparatus according to this invention;

FIGURE 2 is a cross sectional view illustrating the mold and removable insert member of the apparatus of the invention; and FIGURE 3 is an isometric view showing the removable insert member.

Referring now to FIGURE 1 of the drawings, an arrangement of apparatus is illustrated which is particularly adapted for practicing the process of this invention. As shown in FIGURE 1, mold 10 comprises a shell 11 in the form of a frustum and a base plate member 12 attached to the lower periphery of the shell. In the usual case the base plate member is formed as an integral part of the shell. The surface of the shell as shown can be provided with a decorative design which is imparted to the molded article. While the mold as depicted is suitable for forming an article such as a flower pot, it is to be understood that the mold can conform to other shapes so as to form an article having practically any desired configuration. Base plate 12 attached to lower periphery of shell 11 rests upon four vertical side members 13 which in turn are positioned upon platform 14. Any suitable holding means, such as screws can be employed to secure the base plate member to the vertical side members and these latter members to the platform. Platform 14 can conveniently be the top of a bench or table. Base plate member 12, vertical side members 13, and platform 14 cooperate to form a vacuum chamber which is connected by means of line 16 to a vacuum system or means for exhausting air from the chamber. Any suitable pumping means (not shown) can be used as the vacuum system to produce the desired vacuum in the vacuum chamber and in the passageways formed in shell 11 and communicating with the chamber.

Vertical support members 17 are attached to and extend upwardly from platform 14. A framework 18, which conveniently comprises four angle members connected in the form of a square, is affixed to the upper ends of support members 17. Framework 18 serves as a support for a heating means, such as electrical heating element 19, which rests in the recesses on the angle members. The heating element is connected to a suitable source of electrical current, which is not shown in the drawing. Positioned below framework 18 is a carrier 20 which is adapted to hold a plastic sheet 21 clamped in a horizontal position above mold 10. It is to be noted that heating means 19 is adapted to slide in framework 18 so that it can be positioned other than directly above the carrier. It is important to be able to move the heating means in this manner when inserting a plastic sheet in the carrier in order to provide ample working room and to avoid possible burns to the operator. The carrier comprises four narrow plate members 22 which are joined to one another at their ends so as to form a rectangular frame. The corners of the frame are each provided with an opening through which four of the vertical support members 17 extend. This arrangement of apparatus makes it possible to raise and lower the carrier as may be required in the molding operation. A vertical guide member 23, which is affixed to the underside of carrier 20, passes downwardly through platform 14. By providing the vertical guide member above the platform with a collar 24, fitted with a screw 26, it is possible to lock the carrier in any desired vertical position with relation to the mold and heating element. The intermediate section of each of the plate members 22 of the carrier is cut out in order to provide a recess for lock members 27 which serve to hold the plastic sheet in position in the carrier. Screws 28 furnish means for attaching the lock members securely to plate members 22. When positioning a plastic sheet in the carrier a square is first cut from each of the corners of the sheet so that it may be placed in the recesses of the plate members. Thereafter, the lock members are secured by screws 28, thereby locking the plastic sheet rigidly in place in the carrier. It is to be understood that other arrangements of apparatus for holding the plastic sheet in position can be utilized without departing from the spirit or scope of the invention.

As will be discussed more in detail hereinafter, during the molding operation, a heat exchange medium is utilized to maintain the surface of the mold at a desired temperature. The heat exchange medium is supplied to the mold by means of line 31 and is withdrawn therefrom through line 32. A closed system is utilized, pump 33 providing the means for circulating the water through the system. Line 34 is attached to the system in order to furnish any make-up heat exchange medium which may be necessitated by losses occurring during the molding operation. An indirect heat exchanger 37 is provided in line 31 in order that the water being circulated through the mold can be brought to a desired temperature. Temperature controller 38 is operatively connected to outlet line 32 and to a motor valve 39 in the line supplying heat exchange medium to heat exchanger 37. This arrangement of apparatus furnishes means for controlling the amount of heat exchange medium supplied to heat exchanger 37 in accordance with the temperature of the heat exchange medium in line 32.

A better understanding of the mold and the removable insert member associated therewith can be obtained by referring to FIGURE 2. Identical reference numerals have been used to designate elements which have been previously referred to in conjunction with FIGURE 1. Mold 10 is hollow, being in the form of a shell 11 open at one end and having walls with an exterior surface in the shape of the article to be fabricated. A plurality of passageways 42 are formed in the walls of the shell and communicate with the exterior surface of the shell by means of smaller passageways 43. A groove 44 is cut around the lower periphery of the shell in base plate 12. A series of smaller passageways 45 extend from this groove through the base plate or the side of shell 11. These latter passageways communicate with both the larger passageways 42 and the vacuum chamber of which base plate 12 forms one side.

Positioned within shell 11 is an insert member 46 having an outer surface with substantially the same configuration as the inner surface of the shell. The surface of the insert member, which is spaced apart from the inner surface of the shell, has a helical screw thread 47 formed thereon. The structure of the insert member can be better understood by also referring to FIGURE 3 of the drawing in which identical reference numerals have been used to designate previously described elements. When the insert member is in position in the shell, the helical thread is held firmly in place against the inner surface of the shell by means of bolts 48 which pass through bolt holes 49 in the insert member and are threaded into the wall of the shell. It is seen that the sides of the helical thread, the outer surface of the insert member and the inner surface of the shell form a spiral channel 50 extending from the top to the bottom of the insert member. A central opening 51 formed in insert member 46 provides means for passing water or other suitable heat exchange medium through the insert member and into the upper end of the channel formed by the helical thread. Another opening 52 forced in the insert member extends from the bottom of this member to the lower end of the channel formed by the helical thread. Opening 52 furnishes means for withdrawing heat exchange medium from the apparatus after it has circulated through the spiral channel. Openings 51 and 52 are each provided with threads to which lines 31 and 32 respectively, as shown in FIGURE 1, are connected. Flange 53 of insert member 46 is provided with passageways 54 which form an extension of passageways 42 of shell 11.

In practicing the process of this invention utilizing the apparatus described in the drawing, a thermoplastic sheet 21 of desired thickness is clamped into carrier 20 so that the edges of the sheet are held firmly in place therein. As mentioned above, with the carrier shown, it is necessary to trim the four corners of the sheet so that it will fit in the recesses of plate members 22. While the apparatus illustrated can be advantageously utilized in vacuum forming any plastic sheets, including those formed of low density polymers, the process of this invention is applicable to the molding of sheets of high-density, highly crystalline polymers. When using conventional vacuum forming processes to mold articles of high-density, highly crystalline polymers, it has been found that non-uniform products are obtained. Furthermore, the articles obtained have a tendency to warp or distort at normal temperatures after being cooled down from the temperatures used in the forming operation. It has now been discovered that if the surface of the mold is maintained at a temperature in the range of 150 to 230° F., molded products of high-density, highly crystalline polymers are obtained which are uniform and warpage-free. The specific temperature to be used in any particular vacuum forming operation will vary somewhat, depending upon the configuration of the mold, the polymer utilized, and the thickness of the polymer sheet, and can be readily determined by those skilled in the art in view of the instant disclosure.

The plastic sheets used in the process of this invention are formed by conventional methods, e.g., by extrusion or calendering methods, from polymers having a crystallinity of at least 70 percent, preferably at least 80 percent, and more desirably at least 90 percent, at 25° C. The crystallinity of the polymers can be determined by measurements of nuclear magnetic resonance using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall of about 1.5° C. per minute at 135° C. The ethylene polymers used have a density of at least 0.94 at 25° C., while the polymers of propylene have a density of about 0.90 at 25° C. The polymers often have an inherent viscosity of at least 0.8, preferably an inherent viscosity between 1.2 and about 10, as determined from a solution of 0.2 gram of polymer in 50 cc. of tetralin at 130° C. The softening point of the polymer will vary with the particular polymer used, increasing as the density and crystallinity of the polymer increases. Generally, the softening point is above about 250° F., preferably in the approximate range of 250 to 330° F., and is several degrees, e.g., about 10° F., higher than the melting point of the polymer.

Polymers having the above-described properties are preferably produced according to a method described in U.S. Patent 2,825,721, issued on March 4, 1958 to J. P. Hogan and R. L. Banks. As set forth in detail in this patent, the polymers to be used in the present invention can be produced by contacting an aliphatic 1-olefin, such as ethylene or propylene, or mixtures of ethylene and other unsaturated hydrocarbons, e.g., mixtures of ethylene with minor amounts of monoolefins containing up to and including six carbon atoms per molecule, such as propylene, 1-butene and 1-pentene, with a catalyst comprising as its essential ingredient chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic material to be used in the vacuum forming process of this invention be formed from polymers of ethylene produced in accordance with the Hogan and Banks method. The term "polymers of ethylene" as used herein is intended to include polymers obtained by polymerizing ethylene and mixtures of ethylene and other unsaturated hydrocarbons.

Polymers suitable for use in the present process can also be obtained by other methods, e.g., by proceeding according to the processes disclosed by J. A. Reid in copending application Serial No. 494,281, filed March 14, 1955, and now abandoned, and by H. D. Lyons and Gene Nowlin in copending U.S. application Serial No. 495,054, filed March 17, 1955, both assigned to the assignee of the instant application. As disclosed in the first of these patent applications, a solid olefin polymer, such as a polymer of ethylene, can be produced by contacting ethylene with a catalyst comprising a mixture of an organometallic compound, such as an aluminum trialkyl, and a halide of a group IV metal of the periodic table, such as titanium tetrachloride. As disclosed in the latter of the foregoing patent applications, an olefin, such as ethylene, is polymerized in the presence of a catalyst comprising an organometallic halide, such as ethylaluminum dichloride, and a halide of a group IV metal, such as titanium tetrachloride, so as to provide a high molecular weight olefin polymer.

Referring again to the drawing, after placement of the plastic sheet in carrier 20, heating element 19 is turned on and the carrier is moved to a position near this element. The carrier is maintained in proximity to the heating element until the plastic sheet reaches a temperature sufficient to render it in the partially molten state. In general, the plastic sheet is heated to a temperature above its softening point, e.g., to a temperature in the approximate range of 350 to 400° F. After the plastic sheet has been heated to the desired temperature, the heating element is turned off and the carrier 21 is allowed to drop down over mold 10.

Prior to or at about the same time that the carrier is lowered into position, the vacuum system is placed into operation. As a result, a vacuum is drawn in the chamber formed below the mold and in passageways 42, 43, and 45 formed in shell 11. The air is thereby exhausted from between the plastic sheet and the outer surface of the mold so that plastic sheet is forced by atmospheric pressure firmly against the surface of the mold. The vacuum drawn in passageways 45, which communicate between groove 44 and the chamber, cause the plastic sheet to be forced firmly against the lower periphery of the mold.

During the molding operation, a heat exchange medium, such as water, is being continuously circulated through spiral channel 50. The water is supplied to the channel through central opening or conduit 51 connected to inlet line 31 while it is withdrawn therefrom by means of opening or conduit 52 connected to outlet line 31. The temperature of the water circulating through the mold in this manner is so controlled that the exterior surface of the mold is at a temperature in the range of about 150 to 230° F. when it is initially contacted with the molten polymer sheet. After the initial contacting it is to be understood that the temperature of the mold surface may rise to a temperature somewhat above the aforementioned range because of the transfer of heat from the sheet to the mold. However, the critical temperature has been found to be the initial contacting temperature, and any slight temperature rise caused by the transfer of heat from the sheet to the mold does not have an adverse effect on the finished article. This temperature control can be readily accomplished by using a temperature sensing element to measure the temperature of the surface of the mold and then utilizing this temperature measurement to control the temperature of the water being circulated through the mold. However, it is preferred to utilize the temperature control system illustrated in the drawing. As shown in FIGURE 1, a temperature controller 38, which is operatively connected to outlet line 32, is utilized to control a motor valve 39 positioned in the heat exchange fluid inlet line of the heat exchanger 37. It has been found that in any particular molding operation there is a constant temperature differential between the surface temperature of the mold and the temperature of the heat exchange medium leaving the mold. Temperature controller 38 operates so as to maintain the temperature of the outlet water in line 32 at a desired level. For example, if the temperature of the outlet water exceeds the setting given to temperature controller 38, this instrument functions so as to increase the opening of valve 39 and supply additional coolant to heat exchanger 37. The water flowing through heat exchanger 37 is thereby cooled to a lower temperature until such time as the outlet water flowing through line 32 reaches a temperature corresponding to the index setting of the temperature controller. Conversely, if the temperature of the outlet water flowing in line 32 should fall below the index setting of the temperature controller, the opening of motor valve 39 is decreased in response to a signal from the controller. Less coolant is thereby supplied to heat exchanger 37, and the water is supplied to the mold at a higher temperature. As a result, the water leaving the mold is also at a higher temperature, and this latter temperature increases until such time as it corresponds to the index setting of the temperature controller. Operation in this manner so as to maintain the temperature of the outlet water from the mold at a certain level results in the temperature of the mold being maintained at a desired value. The temperature controller, which is preferably of the pneumatic type, is a commercially available item of manufacture and may be obtained from the Brown Instrument Company, Philadelphia, Pa.

During the above described vacuum forming procedure, the temperature of the outlet water in line 32 is controlled so that the temperature of the mold is in the range of about 150 to 230° F. at the beginning of each cycle of operation. While the mold temperature may be outside of this temperature range upon completion of a cycle of operation, the temperature control system operates to return the mold temperature to that range before the next cycle of operation commences. In any particular system, the temperature of the outlet water corresponding to a mold temperature in the aforementioned range can be readily determined by measuring the mold temperature with a surface pyrometer while varying the temperature of the inlet water. When the mold temperature steadies at a temperature in the range of 150 to 230° F., the outlet water is at the required temperature. This latter temperature is then measured, and the temperature controller is given an index setting corresponding to this measurement. It is to be understood that any suitable control system can be utilized in accordance with this invention to maintain the mold at a temperature in the critical temperature range.

In order to facilitate removal of the molded article from the mold, it is usually cooled by means of a stream of cool air. After removal from the mold, any flash which may be present is trimmed from the molded article. It is also within the scope of the invention to treat the molded article at this time by annealing same at temperatures below the softening point of the polymer in order to relieve stresses imparted to the article during the vacuum forming operation. It has been found that by carrying out the vacuum forming operation so that the mold is at a temperature in the range of 150 to 230° F. when it is initially contacted with the plastic sheets, molded articles are produced which are uniform and which will not warp or distort at normal temperatures.

A better understanding of the present invention can be obtained by referring to the following illustrative examples which are not intended, however, to be unduly limitative of the invention.

EXAMPLE I

A series of runs was carried out in which articles were produced in a vacuum forming operation utilizing plastic sheets formed of a high density, highly crystalline polyethylene. The polyethylene was prepared according to a method described in the Hogan and Banks patent referred to hereinbefore using a chromium oxide-containing catalyst. Typical physical properties of polyethylene prepared by this method are as follows:

Density, g./cc. at room temperature [1] _____ 0.940–0.970
Crystallinity, percent [2] _____ 92
Softening temperature, ° F.[3] _____ 260
Brittleness temperature, ° F.[4] _____ −180
Melt index [5] _____ 0.2–5
Heat distortion temperature, ° F.[6] _____ 170
Tensile strength (max.), p.s.i.[7] _____ 4,400
Impact strength, IZOD (ft./lbs. in notch)[8] __ 1.2–14

[1] Determined by immersion in a solvent having a density equal to that of the polymer, a Westphal balance being utilized.
[2] Method adapted from that of Mathews, Pieser and Richards, Acta Cryst 2, 85, (1949).
[3] Determined by the use of a Goodrich plastometer as described by Karrer, Davies and Dietrich, I & E Chem, Analytical Edition, 2, 96–99 (1930) on the plasticity curve obtained according to the published method, the point at which the tangent to the curve a slope of 60° was determined, and the tangent was extrapolated to obtain the softening temperature.
[4] ASTM D-746-55T.
[5] ASTM D-1238-52T.
[6] ASTM D-646-45T.
[7] ASTM D-412-51T (Die C-Crosshead speed 20 in./min.).
[8] ASTM D-456-54T (¼″ Bar).

The male form mold utilized in these runs was machined from an aluminum plate in the form of a shield. The mold had a 14″ x 14″ base plate, and the shield itself had a diagonal measurement of 9¼ inches. The height from the bottom of the sealing groove around the shield to the highest point on the face of the shield was ½ inch. A clamping frame or carrier similar to that shown in the drawing was used to hold the plastic sheets. There was a ¼″ clearance between the edges of the base plate of the mold and the inside edges of the clamping frame.

During each vacuum forming operation, heating rods were moved in proximity to the mold in order to heat the mold. Thereafter, the heating rods were moved away from the mold, and a 60 mil plastic sheet formed by extrusion of the above-described polyethylene, was placed in the clamping frame. The plastic sheet was then heated, the heater rods during this period being 5 inches above the sheet while the sheet was 9 inches above the face of the mold. The clamping frame was then pulled down ½ inch below the base plate of the mold so as to ensure a good vacuum seal. During this period, a vacuum system was in operation so as to evacuate air from between the shield and the plastic sheet. A surface pyrometer was used to check the surface temperature of the mold just prior to contacting the plastic sheet with the mold. The heating of the plastic sheet required 40 seconds while the forming operation took 25 seconds, giving a total cycle time of 65 seconds. The formed article was immediately cooled after the forming operation by means of a blast of air from an air hose. The results of the various runs are set forth hereinbelow in Table I. The temperature shown in the column labeled "Mold Temperature" is the temperature of the mold just prior to its being contacted with the plastic sheet.

Table I

| Run No. | Mold Temperature, ° F. | Warpage, inch [1] | Direction of Warpage [2] |
| --- | --- | --- | --- |
| 1 | 78 | ⅝ | Concave. |
| 2 | 95 | ½ | Do. |
| 3 | 110 | ⅜ | Do. |
| 4 | 150 | 5/16 | Do. |
| 5 | 175 | None | Flat. |
| 6 | 190 | None | Do. |
| 7 | 205 | 1/16 | Convex. |
| 8 | 210 | 3/16 | Do. |
| 9 | 215 | ⅜ | Do. |
| 10 | 230 | ⅜ | Do. |
| 11 | 235 | ¾ | Do. |

[1] Warpage was measured after the molded articles had cooled to room temperature by placing the article on a flat surface, holding one edge of the article firmly against the flat surface, and measuring the distance the opposite edge was raised above the flat surface. No difference was noted in the amount of warpage after the articles had set at room temperature for one week.
[2] Direction with respect to mold face.

From a consideration of the data in Table I, it is seen that with the particular mold and polymer sheets used no warpage of the molded articles occurred when the molten sheets contacted the mold having a surface temperature of 175 and 190° F. It is noted that these temperatures are between 150 and 230° F. which, as discussed hereinbefore, is the temperature range in which the mold surface is maintained at initial contacting of the molten polymer sheets in accordance with this invention in order to obtain uniform, warpage-free products.

EXAMPLE II

A series of runs was carried out in which light diffuser panels were vacuum formed from 60 mil sheets of polyethylene. Apparatus similar to that shown in the drawing was utilized in these runs. The polyethylene used in extruding the 60 mil sheets was similar to the polymer described in Example I. The procedure followed was to place a plastic sheet in the carrier and then move the carrier near the heating element in order to heat the sheet. The carrier was then moved downwardly until the edge of the carrier was below the base plate of the mold. The surface of the mold was maintained at a desired surface temperature by circulating water through the mold as described in conjunction with the drawing. During the molding operation, a vacuum system was operating so as to evacuate air from between the sheet and mold surface.

After being formed, the panel was removed from the mold and allowed to reach room temperature. A section was then cut from the panel annealed in an autoclave at 250° F. and 15 p.s.i.g. for 20 minutes. The amount of shrinkage was determined after the annealed section had reached room temperature. The results of these runs are set forth hereinbelow in Table II. The column labeled "Mold Surface Temperature" in this table indicates the temperature of the mold immediately before it was contacted with the polyethylene sheets. The mold temperature was measured in each case with a surface pyrometer.

Table II

| Run No. | Mold Surface Temperature, °F. | Shrinkage in./in. | | Warpage Observed |
|---|---|---|---|---|
| | | TD[1] | MD[2] | |
| 12 | 195 | 0.030 | 0.028 | Smooth surface—no perceptible warpage. |
| 13 | 170 | 0.030 | 0.028 | Do. |
| 14 | 150 | 0.031 | 0.031 | Do. |
| 15 | 140 | 0.032 | 0.031 | Surface rough. |
| 16 | 100 | 0.034 | 0.033 | Do. |

[1] Transverse direction of the sheet.
[2] Machine direction of the sheet.

It is seen from an examination of the data in Table II that desirable molded articles were obtained when mold surface temperatures of 150, 170 and 195° F. were employed. All of these temperatures are in the range of 150 to 230° F., the temperature range in which the molding operation of this invention is conducted. However, when temperatures outside of the range, i.e., below 150° F., were used, non-uniform articles having a rough surface were obtained.

EXAMPLE III

A series of runs was conducted in which compartmented food trays were vacuum formed from 125 mil sheets of polyethylene. Apparatus similar to that shown in the drawing was used in these runs, and the sheets were formed of a polymer similar to the polymer described in Example I. The procedure followed in forming the trays was the same as that used in Example II. The mold utilized in these runs had a configuration such as to give a tray which was 16 inches wide and 22 inches long and had a depth of 1.5 inches at several points.

After the trays had cooled to room temperature, each tray was placed on a flat surface, and the distance from the bottom of the tray to the flat surface was measured at each corner of the tray. The maximum measurement, termed warpage, is shown hereinbelow in Table III for each of the runs. The mold temperature shown in the table is the surface temperature of the mold when the mold was initially contacted with the molten polymer sheet.

Table III

| Run No. | Mold Temperature, °F. | Warpage, inch[1] |
|---|---|---|
| 17 | 160 | ⅜ |
| 18 | 190 | 3/16 |
| 19 | 210 | ⅛ |
| 20 | 225 | <1/16 |

[1] According to specification requirements, a tray having a warpage value of ⅛ inch or less was considered to be satisfactory.

It is seen from an examination of the data shown in Table III that with the particular mold and polymer sheets employed mold surface temperatures of 210 and 225° F. gave satisfactory products. These temperatures are in the range of 150 to 230° F., the temperature range in which the vacuum forming process of this invention is carried out.

It will be apparent to those skilled in the art that variations and modifications of the instant invention can be made in view of the foregoing disclosure. Such variations and modifications are believed to clearly come within the spirit and scope of the invention.

We claim:

1. In a process in which a sheet of a polymer having a density of at least 0.90 at 25° C. and a crystallinity of at least 80 percent at 25° C. is formed into a molded article by heating the sheet and thereafter pulling the sheet around a mold by evacuating air from between the mold and sheet, the improvement which comprises controlling the temperature of said mold so that its surface temperature is in the range of about 150 to about 230° F. when said sheet initially contacts said mold surface.

2. A process for vacuum forming an article from a plastic sheet formed of a polymer having a density of at least 0.90 at 25° C. and a crystallinity of at least 80 percent at 25° C. which comprises heating said sheet to above its softening point; moving said heated sheet into contact with a mold having its surface at a temperature in the range of 150 to 230° F.; evacuating air from between said sheet and said surface of said mold so as to force said sheet tightly against said mold; and recovering the molded article so formed.

3. A process for vacuum forming an article from a sheet of polyethylene having a density of at least 0.94 at 25° C. and a crystallinity of at least 90 percent at 25° C. which comprises heating said sheet to a temperature above its softening point; moving said heated sheet into contact with a mold; controlling the temperature of said mold so that its surface temperature is in the range of 150 to 230° F. when said sheet initially contacts said mold; evacuating air from between said sheet and said mold so as to force said sheet tightly against said mold; and removing the molded article so formed from said mold.

4. The process according to claim 3 wherein a heat exchange medium is circulated through said mold, the temperature of said medium being controlled so as to maintain the surface temperature of said mold in the range of 150 to 230° F.

5. A process for vacuum forming an article from a sheet of polyethylene having a density of at least 0.94 at 25° C. and a crystallinity of at least 90 percent at 25° C. which comprises heating said sheet to a temperature above its softening point, moving said heated sheet into contact with a mold; circulating water through passageways formed in said mold, measuring the temperature of water leaving said mold; adjusting the temperature of water entering said mold in response to said temperature measurement so that said mold has a surface temperature in the range of 150 to 230° F. when said sheet initially contacts said mold; evacuating air from between said sheet and said mold so as to force said sheet tightly against said mold; and removing the molded article so formed from said mold.

References Cited in the file of this patent

UNITED STATES PATENTS

| | | |
|---|---|---|
| 2,531,539 | Smith | Nov. 28, 1950 |
| 2,580,883 | Borkland | Jan. 1, 1952 |
| 2,660,761 | Peters | Dec. 1, 1953 |
| 2,694,227 | Fordyce et al. | Nov. 16, 1954 |
| 2,781,078 | Dovidio | Feb. 12, 1957 |

FOREIGN PATENTS

| | | |
|---|---|---|
| 808,389 | Great Britain | Feb. 4, 1959 |

OTHER REFERENCES

Jones & Boeke, "Properties of Marlex 50 Ethylene Polymer," Industrial & Engineering Chemistry, July 1956, pages 1155–1161.